United States Patent
Black (10) Patent No.: US 9,545,570 B2
(45) Date of Patent: Jan. 17, 2017

(54) SELF-BALANCING GAME ACHIEVEMENT VALUES

(71) Applicant: Google Inc., Mountain View, CA (US)

(72) Inventor: Raven Black, Alviso, CA (US)

(73) Assignee: GOOGLE INC., Mountain View, CA (US)

( * ) Notice: Subject to any disclaimer, the term of this patent is extended or adjusted under 35 U.S.C. 154(b) by 288 days.

(21) Appl. No.: 14/491,282

(22) Filed: Sep. 19, 2014

(65) Prior Publication Data

US 2016/0082351 A1    Mar. 24, 2016

(51) Int. Cl.
*A63F 13/35* (2014.01)
*A63F 13/798* (2014.01)

(52) U.S. Cl.
CPC ............ *A63F 13/35* (2014.09); *A63F 13/798* (2014.09)

(58) Field of Classification Search
USPC .......................................... 463/42
See application file for complete search history.

(56) References Cited

U.S. PATENT DOCUMENTS

| | | |
|---|---|---|
| 7,192,352 B2 | 3/2007 | Walker et al. |
| 8,762,197 B2 | 6/2014 | Dhillon et al. |
| 9,278,288 B2* | 3/2016 | McCarthy ............. A63F 13/497 |
| 2007/0173321 A1 | 7/2007 | Shen et al. |
| 2014/0052511 A1 | 2/2014 | Gouchtchina et al. |
| 2014/0200062 A1* | 7/2014 | Paradise ................. A63F 13/00 463/16 |
| 2016/0110960 A1* | 4/2016 | Paradise ................. A63F 13/00 463/42 |
| 2016/0184706 A1* | 6/2016 | Muller .................... A63F 13/12 463/42 |

OTHER PUBLICATIONS

"TrueAchievements", TrueAcheivements, obtained from http://www.trueachievements.com, last visited Sep. 15, 2014.

* cited by examiner

*Primary Examiner* — Pierre E Elisca
(74) *Attorney, Agent, or Firm* — Morris & Kamlay LLP (57) ABSTRACT

A combined metric for the significance of an achievement relative to other achievements, even those in different games, may be generated based on a first metric and a second metric. The first metric may indicate the difficulty of an achievement based on the number of individuals who have completed the achievement. The second metric may indicate an amount of in-game time for the achievement to be completed. A representation of the achievement may be provided to one or more client devices.

24 Claims, 4 Drawing Sheets

SELF-BALANCING GAME ACHIEVEMENT VALUES

BACKGROUND

Many video games, particularly mobile video game applications, have one or more achievements. Completing an achievement may allow a user to progress in the game and/or provide the user with a reward such as in game currency, experience points, or an in-game item (e.g., a weapon, a power-up, a defensive capability, etc.). Completing an achievement may be referred to as unlocking the achievement. In some cases, an achievement may be known as a trophy, badge, award, medal, challenge, etc. An achievement may not be directly related to a goal of a particular game. An achievement may be an arbitrary challenge created by a game developer to be met by the player. It may refer to a challenge that exists outside the usual confines of a game's level. For example, if the game is a first person shooter, the goal may be to complete an in-game mission such as rescuing a majority of a trapped group of people in an allotted time. An example of an achievement may be to rescue all of the people in the trapped group. Another achievement may be to rescue the people without firing a single shot. Thus, the achievements may be meant to enhance the playability of the game beyond the in-game missions/quests.

An achievement may be rated by the developer to indicate to game players how difficult the achievement might be. Some gaming platforms maintain achievements beyond the scope of a game itself. For example, a sports game maker may have a football, basketball, and racing series of games. Achievements may be related to ownership of all three types of games. Achievements earned in a game may be associated with points on the platform, which in turn may be used to rank each user of the platform.

Typically, an achievement's difficulty may be determined by a developer or game manufacturer and it may be arbitrary. This may make the achievement lack consistency or meaning between game applications, particularly those made by a different developer. Another issue may be that the developer may be responsible for maintaining an achievement system which can require a substantial amount of work and delay game releases. Further, it may not solve the inconsistency issue mentioned above. If an achievement does not have a difficulty indicator, it may not engage users has much as if there was a difficult indicator. For example, a player may be able to earn several easy achievements or one difficult achievement with the same effort. The incentive to pursue the difficult achievement may be reduced when there is no accolade for it.

BRIEF SUMMARY

According to an implementation, data such as achievement data may be received by a server from several user accounts. Each user account may be associated with one or more client devices that operates a video game application. The achievement data may indicate game play time of a video game application and/or the completion of an achievement related to the video game application. A processor of the server may compute a first metric for each achievement of a video game application. The first metric may indicate a difficulty of an achievement based on a portion of user accounts that have indicated the achievement has been completed. The processor may compute a second metric that indicates an amount of in-game time for the achievement to be completed. The processor may compute a combined metric for the achievement based on the first metric and the second metric. The server may provide a representation of the combined metric for the achievement to one or more client devices.

In an implementation, a system is provided that includes a database and a processor. The database may store achievement data that indicates a game play time of a video game application and/or a completion of an achievement within the video game application. The processor may be communicatively coupled to the database. The processor may be configured to receive achievement data from user accounts. Each user account may be associated with one or more client devices that operates the video game application. The received achievement data may be stored in the database. The processor may compute a first metric for each achievement of the video game application. The first metric may indicate a difficulty of the achievement based on a portion of the user accounts that have indicated that the achievement has been completed. The processor may compute a second metric that indicates an amount of in-game time for the achievement to be completed. The processor may compute a combined metric for the achievement of the video game application based upon the first metric and the second metric. The combined metric may be stored in the database. A representation of the combined metric stored in the database may be provided to one or more client devices.

In an implementation, a system according to the presently disclosed subject matter may include a means for storing achievement data that indicates game play time of a video game application and/or completion of an achievement within the video game application. The system may include a means for receiving achievement data from user accounts. Each user account may be associated with one or more client devices that operates the video game application. The system may include a means to store the received achievement data in a database. The system may include a means to compute a first metric for each achievement of the video game application. The first metric may indicate a difficulty of the achievement based on a portion of the user accounts that have indicated that the achievement has been completed. The system may include a means for computing a second metric that indicates an amount of in-game time for the achievement to be completed. The system may include a means for computing a combined metric for the achievement of the video game application based upon the first metric and the second metric. The system may include a means for storing the combined metric in the database. The system may include a means for providing a representation of the combined metric for the achievement to one or more client devices.

Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Achievements can be automatically ranked based on a number of criteria disclosed herein. Achievement data regarding each player of a video game application may be derived and presented to users. As disclosed herein, four metrics are provided that indicate a difficulty, an amount of in-game time required before completing the achievement, an indication of the rarity of an achievement, and an indication how frequently a game is played prior to an achievement being completed. Two or more of these metrics may be combined to generate an overall indication of an achievement's significance. In some instances, a representation of the combined metric and/or the individual metrics may be presented to end users. The representation may be a representation of the statistics utilized to generate a metric such as the number of individuals who have completed the achievement. Because the ratings are generated from the same statistics, each achievement for each game will be consistently rated for each metric and/or the combined metric. Thus, developers do not need to provide any additional input or management of the achievement system and users can easily compare achievements between games. In addition, the uniformity of metrics as disclosed herein may allow users to compare achievements between games and between games provided by different developers. Similarly, metrics as disclosed herein may allow for comparison of the number and types of achievements obtained by different users even where the users have not played or completed the same games.

Figure 1:
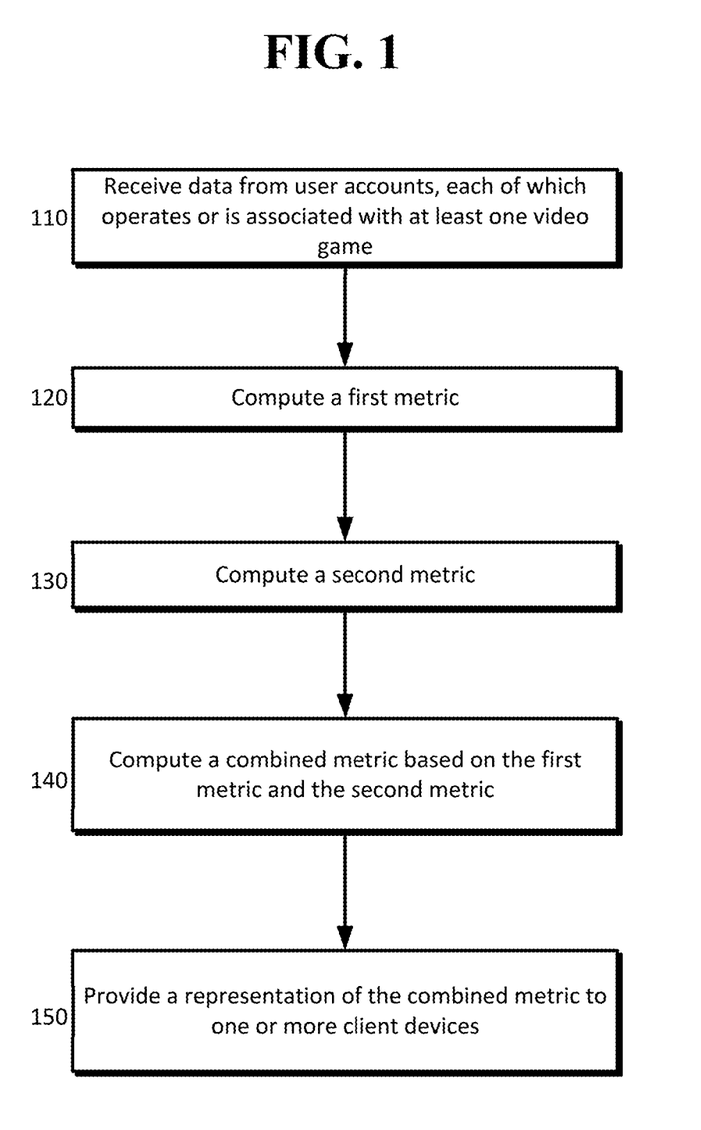
FIG. 1 shows an example process for generating a combined metric as disclosed herein.

In an implementation, an example of which is provided in FIG. 1, a process for generating a combined metric is disclosed. Data or achievement data from user accounts may be received by a server at 110. The data may include an amount of in-game time played by a user associated with a user account before an achievement is unlocked, an amount of time or interval of time since the game was first played by the user before an achievement is completed, an indication that an achievement has been completed, and/or other data related to a video game application. The data may be provided at predetermined intervals by a client device to which the user account is associated, and/or on which the user plays the video game application. For example, the server may receive an indication at midnight every night of the amount of time corresponding to the previous 24 hours that a user played the video game application and whether the user obtained any achievements. If the user obtained any achievements, the achievement may be indicated as well as the time at which it was obtained. The user's in-game activity may be reported as a series of intervals during which each game was played, which may include an indication of specific times at which achievements are obtained. As a specific example, the activity may be reported as Game ABC-10:15:00-10:45:00, Game DEF 11:10:00-11:30-00, Game ABC-12:45:00-14:45:00; Game ABC-achievement XYZ at 13:30:00, to indicate that each of the games ABC and DEF were played during the intervals indicated, and that an achievement XYZ in Game ABC was obtained at time 13:30:00. The amount of in-game time spent by the user to obtain an achievement also may be determined or recorded. Continuing the example above, the amount of in-game time the user spent before obtaining achievement XYZ may be calculated by summing the times the video game application was played prior to 13:30:00. The data may be received by the server in other formats than that which is shown here. For example, one video game application may report statistics to the server upon completion of an achievement, while another may periodically report statistics irrespective of whether an achievement has been completed.

A user account may contain a variety of information about a user such as a user interest, a user name, a user's payment information, an application that the user has installed on a client device, a list of client devices associated with the user account, a purchase history, a browsing history, or the like. The user account data may be stored in a database connected to the server. The server may serve as a central point for storing and browsing applications. It may be, for example, an application or media store for mobile devices. Thus, users may browse content on the server, such as video game applications, movies, music, etc. and elect to install, purchase, and/or rent the content. The server may be coupled to one or more databases that store, for example, the content, installation packages, account verification services, user account data, and/or achievement data. The server may be simultaneously accessed for any of the aforementioned services and others not mentioned here by client devices (e.g., a computer, a phone, a tablet, etc.). Thus, a user may have two client devices, each of which has a copy of a video game application. If the video game application syncs to the server upon launch of the game, for example, each the user's progress in the game (e.g., what achievements have been obtained) may be provided to the client device. A user's in-game time, for example, may be based on the sum of the time spent playing the game on both devices.

Returning to FIG. 1, a processor of the server may compute a first metric for each achievement of a game application at 120. The first metric may indicate a difficulty of an achievement based on a portion of the user accounts that have indicated that the achievement has been completed as described above. The first metric may be computed by determining the number of users who have been awarded the achievement divided by the total number of players. The resulting number may be subtracted from one to obtain the first metric. Equation 1 is an example of one way to compute the first metric.

$$\text{First metric} = 1 - \left(\frac{n \text{ players completed achievement}}{n \text{ total players}}\right). \quad \text{Equation 1}$$

Other methods of computing the first metric may be utilized such as computing the absolute value of the resulting number minus one. For example, the server may receive achievement data for two video games, A and B. Video game A may have been installed and played at least once by ten thousand users and video game B may have been installed and played at least once by one thousand users. One hundred users may have completed an achievement PLAY-1 on video game A (i.e., 100 user accounts have reported an achievement as being completed and/or awarded), and five hundred users may have reported completion of an achievement PLAY-2 on video game B. The achievements PLAY-1 and PLAY-2 may be unique to their respective video game applications. The first metric computed for PLAY-1 and PLAY-2 may be 0.99 (1−(100/10,000)) and 0.50 (1−(500/1000)), respectively.

A second metric may be computed that indicates an amount of in-game time for the achievement to be completed at 130. In-game time may be measured as the time the game application is launched until the application is closed and/or minimized. It may refer to the time a user is playing the video game application. It may be based on keystrokes/touch inputs, for example, received by the client device. The second metric may be computed by determining first values that represent an amount of in-game time until an achievement was completed by user accounts that have reported completion of the achievement. Each of the first values may have a threshold for a maximum amount of time. A mean for the first values may be computed and the mean may be divided by a second value representing the threshold maximum amount of time. The threshold may be established by the server and applied to all games and all achievements thereof for which the metric is computed. Thus, both game A and game B may be subject to the identical threshold value. Equation 2 is an example of one method for computing the second metric for one achievement.

$$\text{Second metric} = \left( \frac{\text{In-game time before achievement earned}}{\text{Threshold amount of time}} \right). \quad \text{Equation 2}$$

For example, a threshold for achieving PLAY-1 and PLAY-2 may be ten hours. This limit may be established by the server and universally applied to all games and all achievements associated therewith. The server may receive an indication that five players have completed PLAY-1 in the following in-game times: 5, 7, 8, 10, and 14 hours. The server may automatically reduce the fifth player's time to the maximum amount of 10 hours. Thus, the five players' times would appear as 5, 7, 8, 10, and 10 hours for the purposes of computing the second metric. The mean may be computed as (5+7+8+10+10)/5=8.0 hours. The mean may be divided by the threshold maximum of 10 to obtain the second metric for PLAY-1 as 0.80. For the purposes of simplicity, the second metric may be computed for PLAY-1 and PLAY-2 as 0.80 and 0.10, respectively. As new users complete the achievement, the first metric and second metric may be updated to reflect the new users' completion data.

The second metric may be computed using other methods as well as the specific values and calculations described and provided by way of example herein. For example, a raw amount of time needed to complete the achievement may be used to compute the mean amount of time for users to obtain the achievement. Further, the example above assumes that PLAY-1 is a more significant achievement than PLAY-2 based on its higher first metric and second metric as compared to that of PLAY-2. However, a system may be designed in which lower scores for the first metric and the second metric may be indicative of a more significant achievement.

The server may compute a combined metric for the achievement of the video game application based upon the first metric and the second metric at 140. For example, the product of the first metric and the second metric may be the combined metric as shown in Equation 3.

$$\text{Combined metric} = \text{First metric} \times \text{Second metric} \quad \text{Equation 3.}$$

Continuing the example above, PLAY-1 may have a combined metric of 0.79 (computed by first metric score 0.99 multiplied by second metric score of 0.80). PLAY-2 may have a combined metric of 0.05. Other methods of generating a combined metric may be used. For example, one system may determine that the first metric moves the combined metric too much. The first metric may be weighted by 5% of its total prior to computing the combined metric. In such a system, the first metric for PLAY-1 may be 1−0.05*0.99=0.94. Any of the metrics disclosed herein may be weighted to increase or decrease the amount that the metric contributes to the combined metric. Similarly, instead of computing the combined metric as shown in Eqn. 3, the combined metric may represent the sum of the first metric and the second metric. Other methods of computing the combined metric may be used according to any of the implementations disclosed herein.

The first metric and second metric may be greatly influenced early when few users have played the game. Because of such variation caused by early adoption, the server may refrain from computing the first, second, and/or combined metric until a minimum number of users have played the game, a minimum amount of time has passed, or the like.

A system as disclosed herein may provide a representation of the combined metric for the achievement to one or more client devices at 150. For example, a user may browse the available achievements for game A and see PLAY-1 among a list of achievements. The combined metric may be represented as graphic to indicate to the user that it is 0.79. Other achievements may have combined metrics computed by the method disclosed above and likewise show the combined metric as a visual representation. The representation does not need to be 0.79. For example, stars may be utilized to indicate what the combined metric is. For PLAY-1, it may show four out of five stars to indicate that it is 0.79. A difference achievement for game A may have a computed combined metric of 0.90 and may show four and half stars out of five stars. Similarly, the server may be browsed using an application on the client device. If a user browses game A, it may show the various achievements associated with game A and the corresponding representation of the combined metric.

In some configurations, a system of awarding points to a user may be based on the combined metric. For example, the system may award 100 points for each achievement a user completes. Continuing the example from earlier, if a first user completes PLAY-1 and a second user completes PLAY-2, the first user may receive 100*0.79=79 points while the second user may receive 100*0.05=5 points. Thus, the system may inherently balance the number of points awarded to users based on the significance of the achievement earned.

In some configurations, a third metric may be computed that may indicate the rarity of an achievement. The third metric may be computed by determining a third value that indicates the number of user accounts that have completed the achievement for a video game application. The third value may be divided by a fourth value that indicates a threshold for a maximum number of the user accounts who have played the video game application. An example method for computing the third metric is provided in Equation 4.

$$\text{Third metric} = 1 - \left(\frac{n \text{ players completed achievement}}{\text{Threshold number of players}}\right). \quad \text{Equation 4}$$

As with the second metric, the threshold for the fourth value may be universally applied to video game applications and achievements therewith. For example, the server may establish a threshold for the fourth value of five thousand. Continuing the earlier example, if 100 and 500 users have obtained the PLAY-1 and PLAY-2 achievements, respectively, and the threshold is set at five thousand, the third metric for PLAY-1 and PLAY-2 may be computed as 100/5000=0.02 and 500/5000=0.10, respectively. In the event that the number of user accounts that have indicated completion of the achievement exceeds the threshold value, then the third metric may be set at one. The third metric may be computed by subtracting the values computed above from one. Thus, the third metric may be 0.98 and 0.90 for PLAY-1 and PLAY-2. If the division of the third value by the fourth value is 1, and the third metric is computed by subtracting one from one, the third metric may be set at a small, non-zero number. The combined metric may computed based on third metric as well. For example, the product of the first, second and third metrics may be computed for the combined metric. The third metric may be weighted to increase or decrease its effect on the combined metric. A representation of the third metric may be provided to one or more client devices as described earlier with respect to the first metric and the second metric.

As with the other metrics, other equations for computing the third metric may be utilized according to implementations disclosed herein. Equation 5 is an example of an alternative method to compute the third metric.

$$\text{Third metric} = \frac{1}{\log_{10}\left(\left(\frac{n}{r}\right) + 10\right)}. \quad \text{Equation 5}$$

In this example, n may refer to the number of individuals who have earned or completed an achievement and r may refer to an arbitrary value established by the server. For example, if zero individuals have completed the achievement and the arbitrary value is set at one hundred, then the third metric may be valued as one. Similarly, if ten user accounts have completed the achievement, the third metric may be 0.996. If one thousand user accounts indicate the achievement has been earned, the third metric may be computed as 0.769. If one million user accounts have completed the achievement, the third metric may be calculated to be 0.25. Thus, the use of a logarithmic scale provides a non-linear scale by which the rarity of an achievement can be measured. A similar non-linear computation may be applied to the first, second, and/or fourth metrics as well.

A fourth metric may be computed that may be an indication of the frequency of gameplay required before an achievement is obtained. The fourth metric may be computed by determining one or more fifth values corresponding to an amount of time until an achievement is completed by each user account. For example, if five users have installed game A on their client devices, each user account of the five users may have a fifth value computed for game A. The fifth values may have a threshold for a maximum amount of time until the achievement is completed. The amount of time may refer to an accounting of a predetermined amount of time. It may refer to the number of days that a user played a game before obtaining the achievement. For example, a user may play a game multiple times on a first day, zero times on a second day, and once on a third day. The fifth value for the particular user with respect to the game may be two because the game was accessed or played on two of the three days. A mean for the plurality of fifth values may be computed and divided by a sixth value that corresponds to the threshold maximum amount of time until the achievement is completed. Equation 6 is an example of one way to compute the fourth metric for one achievement.

$$\text{Fourth metric} = \left(\frac{\text{Time interval for users}}{\text{Threshold time interval}}\right). \quad \text{Equation 6}$$

The mean time interval shown as the numerator value in Eqn. 6 may be in a unit of measurement selected by the server. In some configurations, it may refer to a number of days on which a game is played on a client device associated with a user account before the achievement was completed. In some configurations, it may refer to the number of hours that a game was played before the achievement was completed. For example, if a user played the game for ten minutes every hour for four one hour periods, the time interval for the user may be four. If a second user played the game for fifty minutes for four one hour time periods, the time interval for the second user may also be four.

As a specific example, five users may have game A installed on their respective client devices and play the game the following number of days before completing the achievement PLAY-1: 10, 12, 18, 15, and 8 days. The threshold maximum (i.e., the sixth value) may be 15 days. Thus, the mean for the five users may be computed as (10+12+15+15+8)/5=12 days. The fourth metric may be computed as 12 days mean divided by 15 days threshold to make the fourth metric for game A, achievement PLAY-1 0.75. As above, the threshold value may be universally applied to achievements for all games. The combined metric may be further modified based on the further metric such as by computing the product of the first, second, third, and fourth metric. As with the other metrics, the fourth metric may be weighted to increase or decrease its contribution to the combined metric. A representation of the fourth metric may be provided to the one or more client devices as described earlier. The fourth metric may be converted into a percentile based on its computed value against the fourth metric computed for other achievements. An achievement whose fourth metric indicates that more frequent gameplay is required before the achievement is earned may be in a 95$^{th}$ percentile, indicating that 95% of the computed fourth metrics for other achievements fall below it (e.g., require less frequent play to earn). The first, second, and third metrics may also be converted into a percentile measurement.

Figure 2:
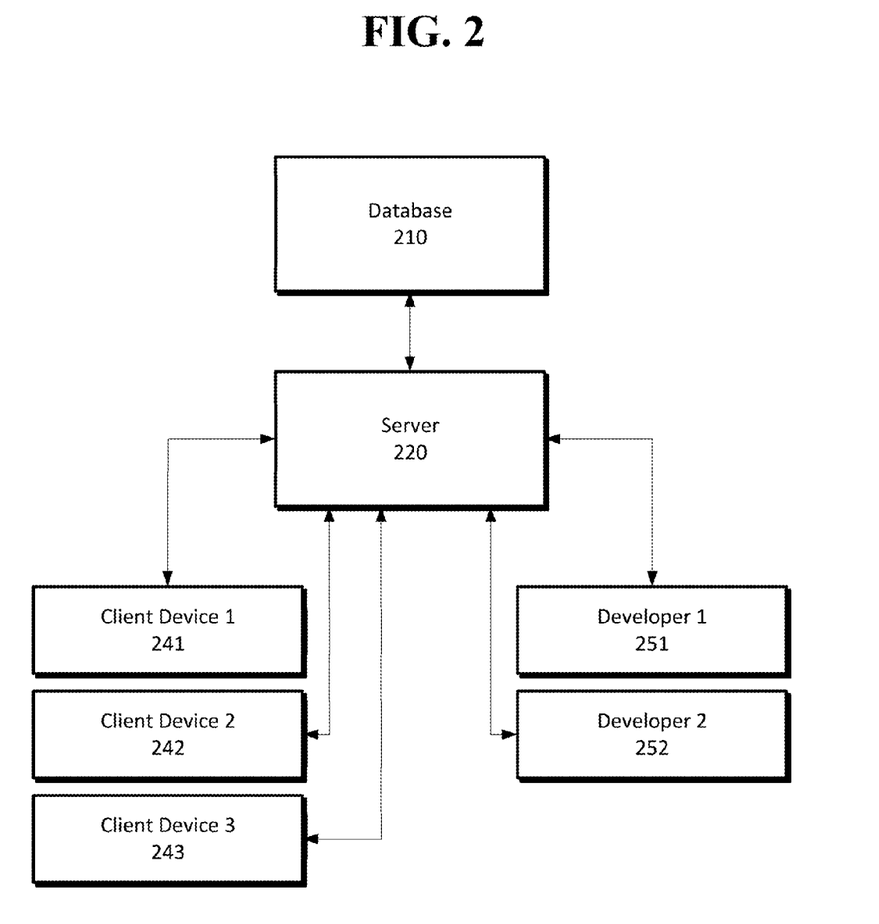
FIG. 2 is an example configuration of devices according to an implementation disclosed herein.

FIG. 2 shows an example configuration of devices that includes a database 210 and a server 220 such as an application store. The database 210 may store achievement data and provide the computed metrics described earlier in response to a request from one or more client devices 241, 242, 243. A developer device (e.g., a laptop, desktop, smartphone, tablet, etc.) 251, 252 may upload game application packages, including updates thereof, to the server.

Each client device 241, 242, 243 may be associated with a user account. The server 220 and database 210 may update and store a record of the user account as described earlier. The server 220 may provide other services such as advertisements and/or transactional services (e.g., purchase or rental of audio/video content). Although specific examples and implementations may be described in the context of a server or devices/hardware associated therewith (e.g., a processor, database, etc.), implementations disclosed herein may be performed by more complex platforms that are involved in application and/or media distribution and management. Such more complex systems may have multiple servers in physically distinct locations and each server may perform a specific functions that are not performed by other servers. For example, one server may perform transactional duties while another server may be involved in distribution of content.

Figure 3:
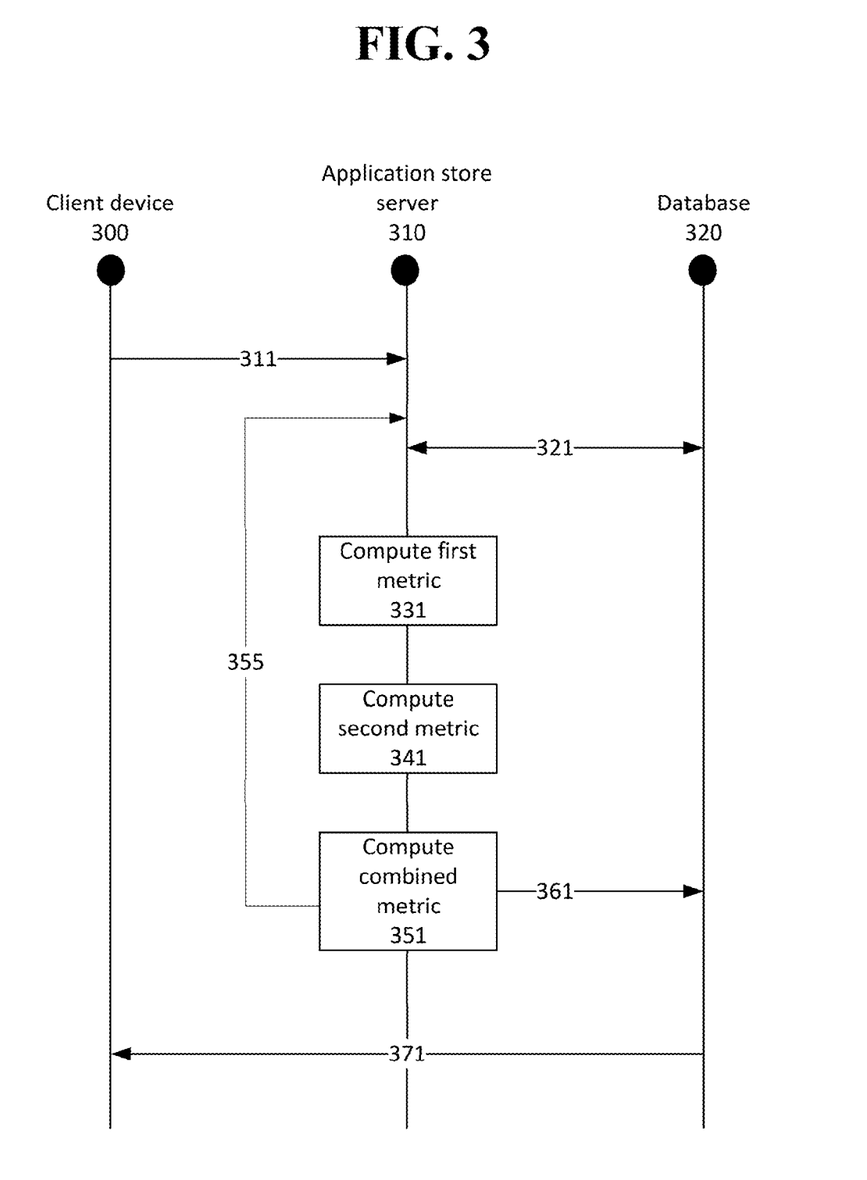
FIG. 3 is an example system that can determine and/or generate a combined metric for one or more achievements for one or more applications as disclosed herein.

In an implementation a system is disclosed, as shown by the example in FIG. 3. The system may include one or more databases 320 for storing data (e.g., achievement data) from user accounts associated with client devices 300. As described earlier, the achievement data may include data regarding the usage of a game application (e.g., an amount of in-game time, an amount of total time played by the user, achievements obtained, etc.). The database 320 may be connected to a processor of a server 310. The database 320 and processor may be components of an application or media store or the like. They may receive and process requests for achievement data, game applications, other content, or information about content provided by the application or media store.

The processor may be configured to receive achievement data from a user accounts at 311 as described earlier. It may store the received data in one or more databases at 321. The processor may receive data other than the achievement data and parse the achievement data from the other data and store it in separate databases. The achievement data may be received periodically, at specified triggers (e.g., launch/exit of the game on the client device), or continuously. In some cases, the processor may request any unsent achievement data from the client device. For example, the client device may not be scheduled to send achievement data until a time subsequent to when the processor would like to collect the data for computing the combined metric. Similarly, the client device of a user may request achievement data for one or more games at scheduled intervals or upon a specified trigger. For example, the client device may update one of the metrics described earlier to provide the user with the most current data regarding one or more achievements for a game application or platform.

The processor may compute a first metric at 331 as described above. Generally, the first metric may indicate a difficulty of an achievement based on the number of user accounts that have indicated that the achievement has been completed. For example, a part of the achievement data may include an indication that a user has completed achievement PLAY-1 for game A. The system may compute the number of user accounts that have indicated completion of each achievement. If a user completes an achievement on one client device, a second client device that is also associated with the user account may likewise receive an indication that the user has obtained an achievement.

A second metric may be computed by the processor that indicates an amount of in-game time for the achievement to be completed at 341 as described above. Similarly, a combined metric may be computed based on the first metric and the second metric at 351 as described above. For example, the product or sum of the first metric and the second metric may represent the combined metric. In some instances, the first metric and/or second metric may be weighted. Other more complicated combinations of the first metric and/or second metric may be utilized as disclosed herein. The combined metric may be updated periodically or as achievement data are received in the database as shown at 355. The combined metric may be stored in the database at 361.

The system may provide a representation of the combined metric for the achievement to one or more client devices at 371. For example, the user may launch a game on a client device that is associated with the user's account. The game may request, from the system, achievement data for the game and/or the user. The achievement data may indicate the combined metric for the various achievements associated with the game. Each combined metric may be further expanded to reveal the first metric and/or second metric data or representations thereof. Thus, the combined metric may inform a user about the significance of an achievement and it may be directly comparable to that of other achievements for other games. Although only the first and second metrics are illustrated in FIG. 3 for clarity, the system also may compute third and fourth metrics as previously described, and/or other metrics or user data, which may be stored and/or associated with the user account as previously described. The combined metric may be used as a component of a game ranking algorithm, for example. Equations 7 and 8 provide example methods of computing the combined metric incorporating the third and fourth metrics.

$$\text{Combined metric} = \text{First metric} \times \text{Second metric} \times \text{Third metric} \times \text{Fourth metric} \quad \text{Equation 7.}$$

$$\text{Combined metric} = \text{First metric} + \text{Second metric} + \text{Third metric} + \text{Fourth metric} \quad \text{Equation 8.}$$

In some configurations, the server may provide a platform by which users may view achievements for video game applications and sort the achievements by their combined metric and/or the first, second, third, and fourth metrics. The achievements for a particular video game application may be similarly ranked/sorted. The system may further compute a score for each user based on the achievements the user has earned and the combined metric for those respective achievements. For example, one user may complete one hundred achievements that all have a combined metric value that indicates the achievements are in the "significant" end of the spectrum of achievements while a second user may complete one hundred achievements that have a combined metric value that indicates the achievements are in the "non-significant" end of the spectrum. The first user may receive a ranking or points that indicate that the first user is earning more challenging or significant achievements as compared to the second user.

Figure 4:
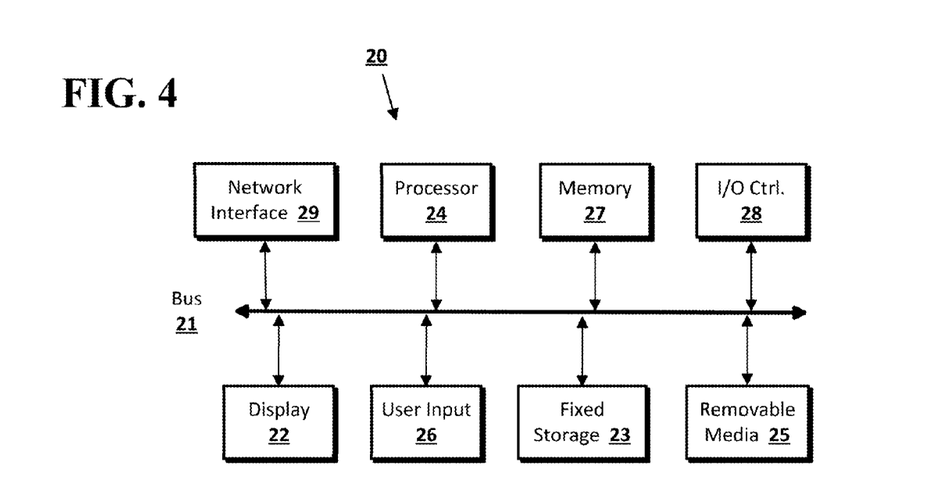
FIG. 4 shows a computer according to an implementation of the disclosed subject matter.

Implementations of the presently disclosed subject matter may be implemented in and used with a variety of component and network architectures. FIG. 4 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 5.

Many other devices or components (not shown) may be connected in a similar manner (e.g., document scanners, digital cameras and so on). Conversely, all of the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, removable media 25, or on a remote storage location.

Figure 5:
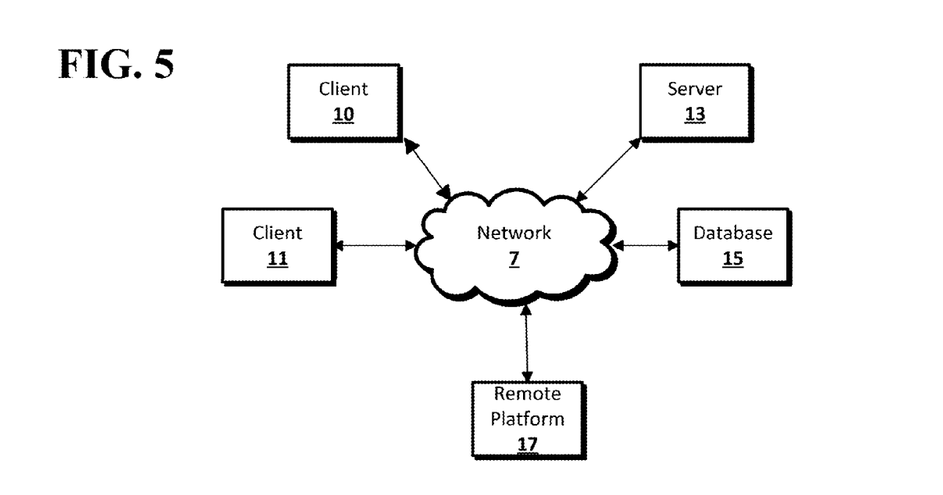
FIG. 5 shows a network configuration according to an implementation of the disclosed subject matter.

FIG. 5 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

In situations in which the implementations of the disclosed subject matter collect personal information about users, or may make use of personal information, the users may be provided with an opportunity to control whether programs or features collect user information (e.g., a user's provided input, a user's geographic location, and any other similar data associated with a user), or to control whether and/or how to receive data from a provider that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by systems disclosed herein.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method, comprising:
receiving, by a server, data from a plurality of user accounts, wherein each user account is associated with at least one of a plurality of client devices that operates a video game application, wherein the data indicates at least one of game play time of the video game application or completion of an achievement within the video game application;
computing, by a processor of the server, for each achievement of a plurality of achievements of the video game application, a first metric that indicates a difficulty of the achievement based on a portion of the plurality of user accounts that have indicated that the achievement has been completed;
computing, by the processor, a second metric that indicates an amount of in-game time for the achievement to be completed;
computing, by the processor, a combined metric for the achievement of the video game application based upon the first metric and the second metric; and
providing, by the server, a representation of the combined metric for the achievement to at least one of the plurality of client devices.

2. The method of claim 1, wherein the average amount of time for each achievement of the plurality of achievements to be completed has a maximum threshold.

3. The method of claim 1, wherein determining the second metric comprises:
determining a plurality of first values comprising the amount of in-game time until the achievement is completed by each of the plurality of user accounts, wherein each of the plurality of first values has a threshold for a maximum amount of time;
computing the mean for the plurality of first values; and
dividing the mean of the plurality of first values by a second value comprising the threshold for the maximum amount of time.

4. The method of claim 1, further comprising:
computing, by the processor, a third metric by:
determining a third value that indicates the plurality of user accounts that have completed the achievement for the video game application; and
dividing the third value by a fourth value that indicates a threshold for a maximum number of the plurality of user accounts who have played the video game application.

5. The method of claim 4, further comprising computing the third metric by subtracting the third value divided by the fourth value from one.

6. The method of claim 5, further comprising computing the combined metric based on the third metric.

7. The method of claim 4, further comprising providing a representation of the third metric to at least one of the plurality of client devices.

8. The method of claim 1, further comprising providing a representation of at least one of the first metric or the second metric to at least one of the plurality of client devices.

9. The method of claim 1, further comprising:
computing, by the processor, a fourth metric by:
determining a plurality of fifth values comprising an amount of time until the achievement is completed by each of the plurality of user accounts, wherein each of the plurality of fifth values has a threshold for a maximum amount of time until the achievement is completed;
computing the mean for the plurality of fifth values; and
dividing the mean of the plurality of fifth values by a sixth value comprising the threshold for the maximum amount of time until the achievement is completed.

10. The method of claim 9, further comprising computing the combined metric based on the fourth metric.

11. The method of claim 1, wherein at least one of the first metric and the second metric is weighted.

12. The method of claim 1, wherein the combined metric is not computed until a threshold minimum number of user accounts have installed the one of the plurality of video game applications.

13. A system, comprising:
a database for storing a plurality of achievement data that indicates at least one of game play time of a video game application or completion of an achievement within the video game application;
a processor communicatively coupled to the database, the processor configured to:
receive achievement data from a plurality of user accounts, wherein each user account is associated with at least one of a plurality of client devices that operates the video game application;
store the received achievement data in the database;
compute, for each achievement of a plurality of achievements of the video game application, a first metric that indicates a difficulty of the achievement based on a portion of the plurality of user accounts that have indicated that the achievement has been completed;
compute a second metric that indicates an amount of in-game time for the achievement to be completed;
compute a combined metric for the achievement of the video game application based upon the first metric and the second metric;
store the combined metric in the database; and
provide a representation of the combined metric stored in the database for the achievement to at least one of the plurality of client devices.

14. The system of claim 13, wherein the average amount of time for each achievement of the plurality of achievements to be completed has a maximum threshold.

15. The system of claim 13, wherein the determination of the second metric comprises:
determining a plurality of first values comprising the amount of in-game time until the achievement is completed by each of the plurality of user accounts, wherein each of the plurality of first values has a threshold for a maximum amount of time;
computing the mean for the plurality of first values; and
dividing the mean of the plurality of first values by a second value comprising the threshold for the maximum amount of time.

16. The system of claim 13, the processor further configured to:
compute a third metric by:
determining a third value that indicates the plurality of user accounts that have completed the achievement for the video game application; and
dividing the third value by a fourth value that indicates a threshold for a maximum number of the plurality of user accounts who have played the video game application.

17. The system of claim 16, the processor further configured to compute the third metric by subtracting the third value divided by the fourth value from one.

18. The system of claim 17, the processor further configured to compute the combined metric based on the third metric.

19. The system of claim 16, the processor further configured to provide a representation of the third metric to at least one of the plurality of client devices.

20. The system of claim 13, the processor further configured to provide a representation of at least one of the first metric or the second metric to at least one of the plurality of client devices.

21. The system of claim 13, the processor further configured to:
compute a fourth metric by:
determining a plurality of fifth values comprising an amount of time until the achievement is completed by each of the plurality of user accounts, wherein each of the plurality of fifth values has a threshold for a maximum amount of time until the achievement is completed;
computing the mean for the plurality of fifth values; and
dividing the mean of the plurality of fifth values by a sixth value comprising the threshold for the maximum amount of time until the achievement is completed.

22. The system of claim 21, the processor further configured to compute the combined metric based on the fourth metric.

23. The system of claim 13, wherein at least one of the first metric and the second metric is weighted.

24. The system of claim 13, wherein the combined metric is not computed until a threshold minimum number of user accounts have installed the one of the plurality of video game applications.

* * * * *